US008844876B2

(12) United States Patent
Prampolini

(10) Patent No.: US 8,844,876 B2
(45) Date of Patent: Sep. 30, 2014

(54) SIMPLIFIED REUSABLE MODULE FOR LAUNCHER

(75) Inventor: Marco Prampolini, Chambourcy (FR)

(73) Assignee: Astrium SAS, Paris (FR)

( * ) Notice: Subject to any disclaimer, the term of this patent is extended or adjusted under 35 U.S.C. 154(b) by 94 days.

(21) Appl. No.: 13/704,136

(22) PCT Filed: Jun. 10, 2011

(86) PCT No.: PCT/EP2011/059663
§ 371 (c)(1),
(2), (4) Date: Dec. 13, 2012

(87) PCT Pub. No.: WO2011/157641
PCT Pub. Date: Dec. 22, 2011

(65) Prior Publication Data

US 2013/0087659 A1 Apr. 11, 2013

(30) Foreign Application Priority Data

Jun. 14, 2010 (FR) ..................................... 10 54695

(51) Int. Cl.
*B64G 1/00* (2006.01)
*B64G 1/62* (2006.01)
*B64G 1/40* (2006.01)

(52) U.S. Cl.
CPC . *B64G 1/401* (2013.01); *B64G 1/40* (2013.01); *B64G 1/62* (2013.01); *B64G 1/002* (2013.01)
USPC ........................................... 244/158.9; 244/2

(58) Field of Classification Search
USPC ............................ 244/158.9, 2, 159.3, 158.1
See application file for complete search history.

(56) References Cited

U.S. PATENT DOCUMENTS 5,090,642 A * 2/1992 Salkeld ...................... 244/171.3
6,450,452 B1 * 9/2002 Spencer et al. ............ 244/159.3
6,454,216 B1 9/2002 Kiselev et al.
6,616,092 B1 * 9/2003 Barnes et al. ..................... 244/2
8,528,853 B2 * 9/2013 Luther ............................. 244/2
2011/0297793 A1 * 12/2011 Prampolini et al. ....... 244/158.9

FOREIGN PATENT DOCUMENTS

WO 99 47418 9/1999

OTHER PUBLICATIONS

International Search Report Issued Sep. 9, 2011 in PCT/EP11/59663 Filed Jun. 10, 2011.

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

A recoverable module for a propulsion module configured to launch a craft into space, the recoverable module including a central body, a propulsion system configured to launch the craft, systems for commanding and controlling the propulsion system, at least one propulsion engine in subsonic flight, lift surfaces for the subsonic flight and landing gear, the lift surface including two substantially flat wings fixed with respect to the central body, arranged on either side of the central body of the module, and a stabilizer mounted articulated for rotation on a downstream end of each wing, each stabilizer including at least one pair of lower wing surface and upper wing surface flaps mounted articulated on the stabilizer or any other flap fulfilling a dynamic function.

21 Claims, 5 Drawing Sheets

X
6
9
4
16
14
13
12
8
10

22
Y
22
19a
18
22
22
Y
19a1
14
21
19b
19b1
30
X1

Y
19a2
X2
22
19a1
X1
22.1
20
22
22.2
19a
8
20
19b1
19b2

X2
22
22
19b 14
26
19a1
8
19a
22
Y
28
18
19b2
22.1
22.2
22
20
19b1
21
X1
30
X2
19b

SIMPLIFIED REUSABLE MODULE FOR LAUNCHER

FIELD OF THE INVENTION AND STATE OF THE RELATED ART

The present invention relates to a reusable module intended to form part of a propulsion module intended to send a craft into space, the craft being for example a launcher intended to send a payload into space, such as telecommunication satellites.

The Ariane V rocket is a well known example of a launcher comprising a central body formed by a first stage, referred as the cryotechnic main stage (CMS) and a second stage, referred to as the storable propulsion stage (SPS). The first stage transports the liquid oxygen and hydrogen cooled to very low temperatures, these fluids supplying a cryotechnic engine. The last stage supports the payload to be launched, for example a satellite. The rocket also comprises, on either side of the central body, two powder accelerator stages (PASs) used for takeoff. The cryotechnic engine is started up before takeoff and functions until the first and second stages separate.

There also exist launchers using methane propulsion or powder propulsion.

These launchers, in particular the first stages of these launchers, are completely consumable, i.e. it is not sought to reuse them.

The development and manufacture of a launcher represent a very high cost. Moreover, such a development is very lengthy.

It has therefore been envisaged designing a launcher the first stage of which is reusable, i.e. it can return to earth without damage after separation thereof from the second stage. Such a launcher is described in the document U.S. Pat. No. 6,454,216. The part of the launcher body forming the first stage is composed of a bottom propulsion part, an intermediate part formed by fuel and oxidant tanks and a top part intended for the return of the whole of the first stage to earth. For this purpose, the first stage is provided with a set of means adapted to allow return to earth and landing thereof. The first stage comprises air foil surfaces folded along the first stage during the launch of the launcher and configures to unfold for the return of the first stage to earth, landing gear, a control system and aerobic engines to provide the return flight and for execution of landing manoeuvres.

This launcher has the advantage of making it possible to completely recover the entire first stage.

However, such a construction has several drawbacks. Firstly, during separation from the first stage, the tanks of the intermediate part are empty and therefore represent a very large volume with a very low mass. Consequently the mean density of the first stage is low, which makes the first stage very difficult to recover. Moreover, it requires the use of a large wing unit attached to the casing of the launcher, in particular at the tanks, which is generally not very rigid. It is therefore necessary to make provision for stiffening the attachment area. The addition of this wing area and reinforcements represents an additional mass that it is necessary to propel, therefore involving an increase in the size of the tanks and therefore a substantial increase in the cost of the launcher. Consequently the gain obtained by entirely recovering the first stage is partially lost in the modifications involved for enabling this recovery. Moreover, this type of launcher is very different from known launchers.

The international patent application PCT/EP2009/067549, not yet published, describes a recoverable module using the empennage of the launcher as a air foil surface, this empennage comprising three fins, two of which form wings of modifiable shape and one of which forms a guide fin. In addition, it uses a parachute for reducing its speed when it enters the atmosphere. This module is entirely satisfactory but it is however sought to further increase its robustness and reliability.

The aim of the present invention is therefore to offer a launcher the operating costs of which are reduced compared with the cost of current launchers.

DESCRIPTION OF THE INVENTION

The aim stated above is achieved by a launcher comprising at least one stage, said stage being divided into two parts, a first part containing the rocket engines, the avionics, the propulsion bay, and the tank pressurization system and the self-contained aerobic flight means (air foil surface, aerobic engine and its fuel), and a second part formed by the tanks, the two parts being separated after launch, the first part comprising means to enable it to return to earth without damage so as to be reused in a new launcher. The first part forms the bottom part of said stage.

In other words, provision is made for reusing the components having a high cost, and for this purpose a detachable module is produced equipped with a airfoil surface and an aircraft engine enabling it to land on a conventional runway. Non-recovery of the tanks makes the recovered part much more easily recoverable, because of its increased density. The bearing surface comprising fixed fins and stabilisers, which makes its implementation and control very simple.

The lower position of the recovered part associated with the presence of fins moreover offers great stability to the launcher itself during the climb phase.

More particularly, the module comprises a lift surface formed by two flat wings each provided at its downstream end with a stabiliser articulated for rotation. The stabilisation and lift functions are therefore separated, which simplifies the optimisation of each of these functions.

Advantageously, provision is made for using the empennage of the launcher as a wing unit for return to earth.

The subject matter of the present invention is then mainly a recoverable module for a propulsion module configured to launch a craft into space, comprising at least one stage, said recoverable module of longitudinal axis being secured to a non-recovered part during launch, said recoverable module comprising a central body, a propulsion system configured to launch the craft, systems for commanding and controlling the propulsion system, means of propulsion in subsonic flight, lift surfaces for subsonic flight and landing gear, the lift surface comprising two substantially flat wings fixed with respect to the central body, arranged on either side of the central body of the module, and a stabiliser mounted so as to be articulated for rotation on a downstream end of each wing, each stabiliser comprising at least one pair of lower wing surface and upper wing surface flaps mounted so as to be articulated on said stabiliser so as to be able to separate from each other in order to be placed on either side of a mid-plane of the stabiliser or to come into abutment against each other so as to form only a single flap, and longitudinal stabilisation means, said recoverable module being intended to be placed in a lower position of said stage, the non-recovered part comprising at least one tank for supplying the propulsion system, said recoverable module and said non-recovered part being intended to be separated when the propulsion module reaches a given altitude, the recoverable module being able to land in a controlled fashion after a cruising flight, for example for a return to the launch site.

In a particularly advantageous manner, the lower wing surface and upper wing surface flaps form the longitudinal stabilisation means when they form only one flap.

Advantageously, the lift surfaces are formed by the empennage of said craft.

In a preferred manner, the stabilisers are articulated for rotation about an axis substantially parallel to the longitudinal axis of the module. For example, the rotational articulation is implemented by a cylindrical coupling or a swivel connection.

The subsonic propulsion means of the module may be of any type, for example it may be a case of aerobic or electrical propulsion, a turboprop engine, a pulse jet, a propeller with a thermal engine or an electrical engine. The propeller may be in the central body or at a wing end.

In a particular example, the recoverable module according to the present invention may comprise two propulsion engines of the turbine engine type, each engine being mounted in the base of a wing.

In the case of a recoverable module according to the present invention equipped with at least one turbojet engine, the module advantageously, comprises a thermal battery for supplying the starter of the subsonic propulsion engine or engines, affording rapid starting of the engines.

The recoverable module according to the invention preferably has a blunt nose.

Another subject matter of the present invention is a propulsion module intended to launch a craft into space comprising at least one stage comprising a recoverable module according to the present invention and a part intended not to be recovered comprising at least one tank for supplying the propulsion system.

The propulsion module may comprise lateral acceleration stages, at least one comprising a recoverable module according to the present invention.

Another subject matter of the present invention is a craft of the launcher type equipped with a propulsion module according to the present invention, comprising at least two stages, one stage formed by the propulsion module and one stage supporting a payload, said two stages being separable.

The launcher according to the invention may be from the nanolauncher type up to a super-heavy launcher. The invention can apply to the central body or to the lateral acceleration stages added to the central body, also referred to as boosters, as in the rocket of the Ariane V type.

The propulsion module preferably forms the bottom stage of the launcher or one of the upper stages.

Another subject matter of the present invention is a method for recovering the recoverable module according to the present invention comprising the steps of:

a) separation of the recoverable module and the non-recovered part, b) free fall of the recoverable module, c) on atmospheric entry, opening of the pairs of lower wing surface and upper wing surface flaps until a given speed is reached, d) closure of the pairs of lower wing surface and upper wing surface flaps, each pair then forming a single flap, e) initiation of the resource by putting the lower wing surface and upper wing surface flaps in position so that they create a deflection moment, f) starting of at least one propulsion engine in subsonic flight at the end of the resource, g) cruising return flight, and h) landing.

Advantageously, the landing is automatic, preferably followed by automatic taxiing in order to leave clear the runway and return to a secure area, which is particularly advantageous in the case where the landing strip is that of an airport.

For example, the end of the resource takes place at an altitude of around 2500 m.

The recovery method according to the invention may comprise, prior to the atmosphere entry phase, a step of modification of the orientation of the stabilisers.

During step a), the separation of the recoverable module and the non-recovered part advantageously takes place in a direction substantially orthogonal to the plane of the trajectory, which makes it possible to discriminate the objects on return to atmosphere.

BRIEF DESCRIPTION OF THE FIGURES

The present invention will be understood better by means of the following description and the accompanying drawings, in which.

DETAILED DESCRIPTION OF PARTICULAR EMBODIMENTS

In the following description, we shall describe in detail a launcher of the two-stage type in order to explain the invention, but naturally the invention is not limited to this type of launcher as will be seen below.

Figure 1:
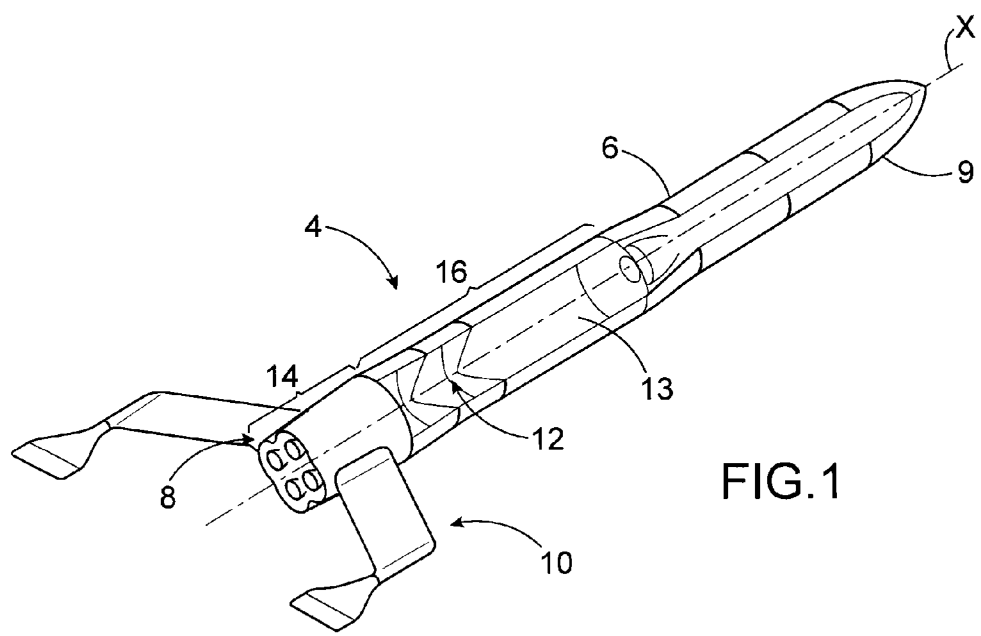
FIG. 1 shows a cutaway view of an example of a launcher according to the present invention.
Figure 2:
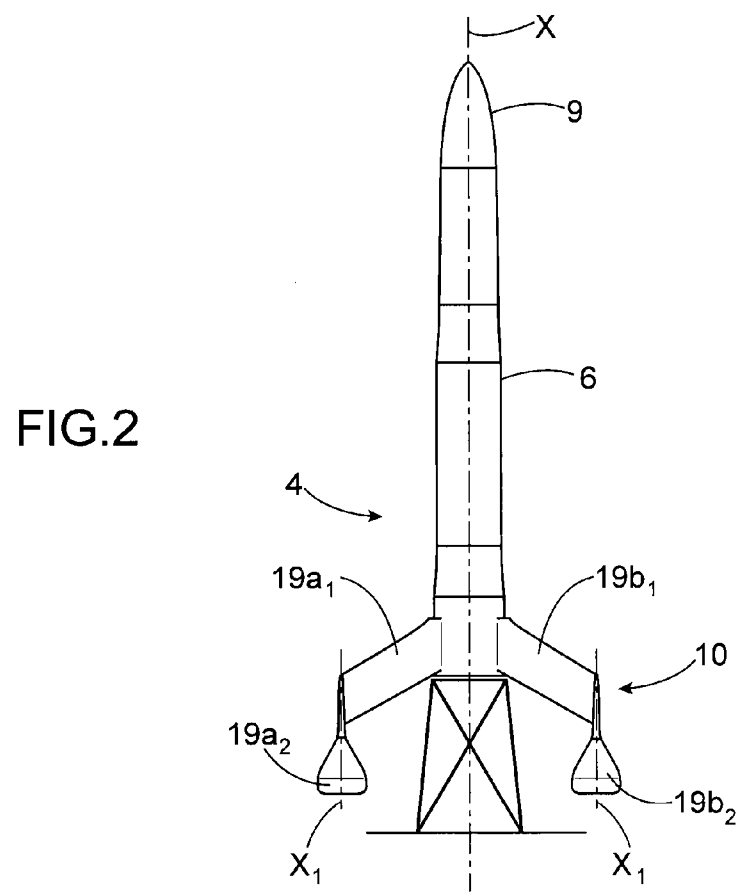
FIG. 2 is a side view of the launcher of FIG. 1 in the launch position.

In FIGS. 1 and 2, a launcher according to the present invention can be seen, intended for example to place telecommunication satellites in orbit.

The launcher 2 comprises a first stage 4, a second stage 6 and a fairing 9. The launcher has a longitudinal axis X along which the stages are arranged. The longitudinal axis X is oriented vertically in the takeoff position of the launcher.

The first stage 4 comprises the elements intended for the propulsion of the launcher, which will be described below.

The second state 6 supports in particular the payload, for example the satellite to be put in orbit.

The first stage comprises, at its bottom end, a propulsion unit 8 providing the takeoff of the launcher. In the example shown, this propulsion unit is composed of four cryotechnic engines and all the engine control means.

The launcher also comprises an empennage 10 at the external periphery of the first stage in its bottom part. The empennage 10 participates, during the takeoff phase, in the aerodynamic stabilisation of the launcher. The empennage is composed of two fins fixed so as to be diametrically opposed on the external surface of the first stage. These fins will be described in detail later in the description.

The first stage 4 also comprises the tanks 12, 13 of substances necessary for supplying the propulsion system 8 during takeoff. These are, in the case of cryotechnic engines, a liquid-oxygen tank 12 and a liquid-hydrogen tank 13.

According to the present invention, the first stage 4 is divided into a first part 14 intended to be reused in a launcher and a second part 16 intended to be lost, referred to as the non-recovered part. The first part 14 is also referred to as the module.

The module 14 comprises the elements having a high cost, the reuse of which is very advantageous. It is a case in particular of the propulsion unit 8 of the launcher, the propulsion bay, the pressurization system, the avionics and the electric power generation means.

The non-recovered part 16 containing the tank or tanks is produced so that it comprises no or few complex parts with a high cost, so as to reduce the costs of the parts to be supplied for a further flight. This being consumable, its structure is reduced to the elements strictly necessary to the supply of the propulsion system effectively and safely.

The module 14 has a high density, since it does not include the empty spaces formed by the tanks after launch.

According to the present invention, the module 14 is such that it provides its return to Earth. In FIGS. 6A to 6F, the module can be seen during the different phases of return to Earth.

In the example shown, the module 14 is provided at the bottom end of the first stage 4. This is because, since the module 14 has a large finned surface and is in a low position, this has the effect of pushing back the aerodynamic centre and therefore increasing the static margin in the phase where the launcher climbs through the atmosphere.

It is then possible to lower the tank full of oxygen, which is the heavier one on takeoff. This has the effect of bringing the oxygen tank closer to the cryotechnic engines, the static margin remaining sufficient to ensure great stability of the launcher. Bringing the oxygen tank 12 and the cryotechnic engines closer together reduces the length of the supply lines of the first stage, leading to a reduction in the mass and capacity and therefore the cost of the first stage.

Provision is made for reusing the empennage as a stabilising surface on re-entry into the atmosphere, and then providing lift for the phase of return to earth. This is in particular made possible by the low position of the module 14, i.e. level with the launcher empennage. This is because the centre of gravity of the recoverable module is situated at the empennage of the launcher and consequently the empennage can be used to provide the aerodynamic lift function of the module during the subsonic flight phase.

We will now describe in detail the module 14, and more particularly the means used to ensure its return to Earth.

Figure 3:
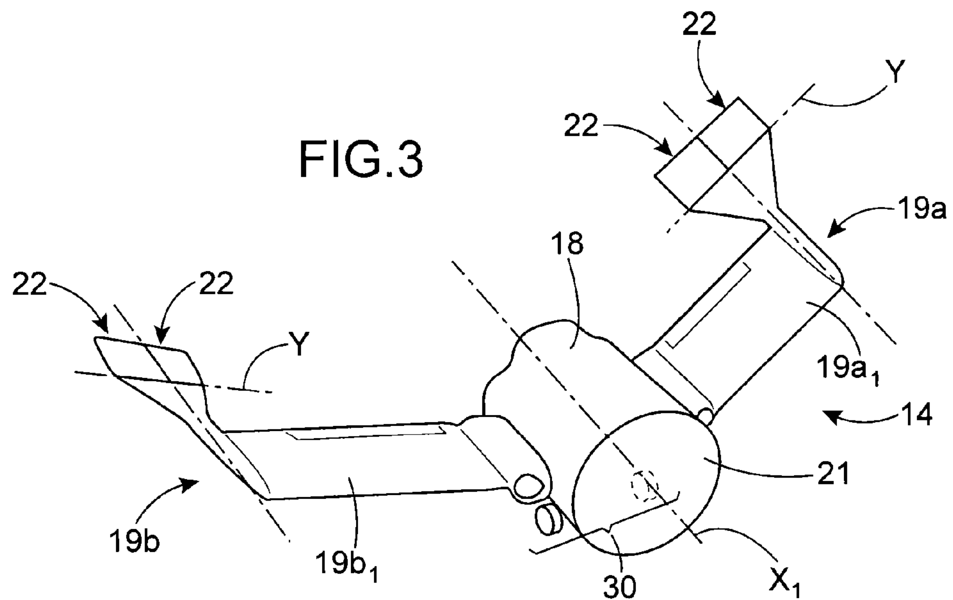
FIG. 3 is a front perspective view of the recoverable module according to the present invention.
Figure 4:
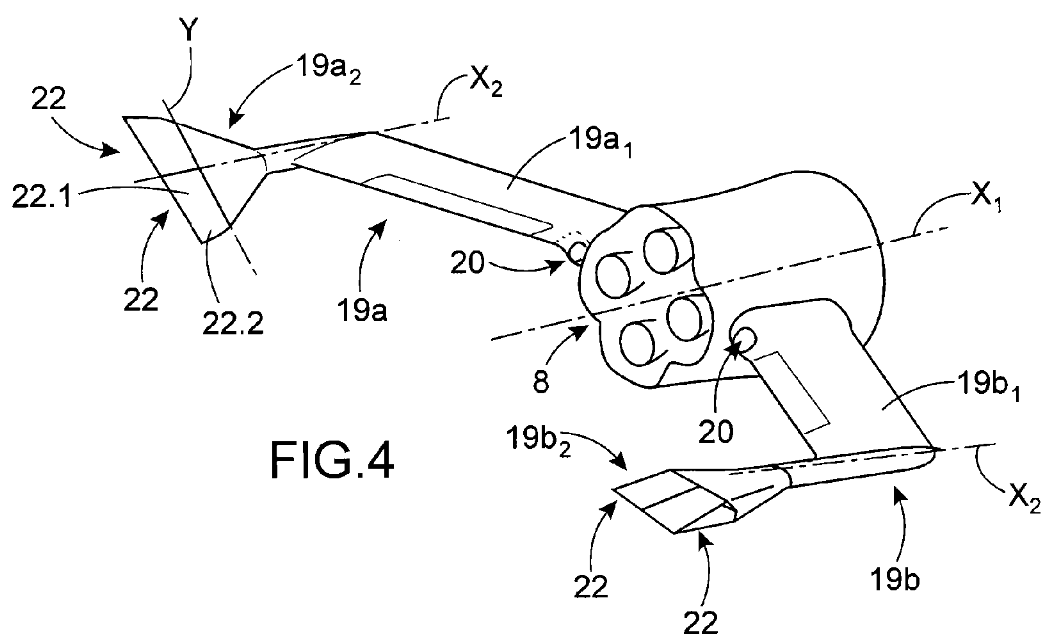
FIG. 4 is a rear perspective view of the module of FIG. 3.
Figure 5:
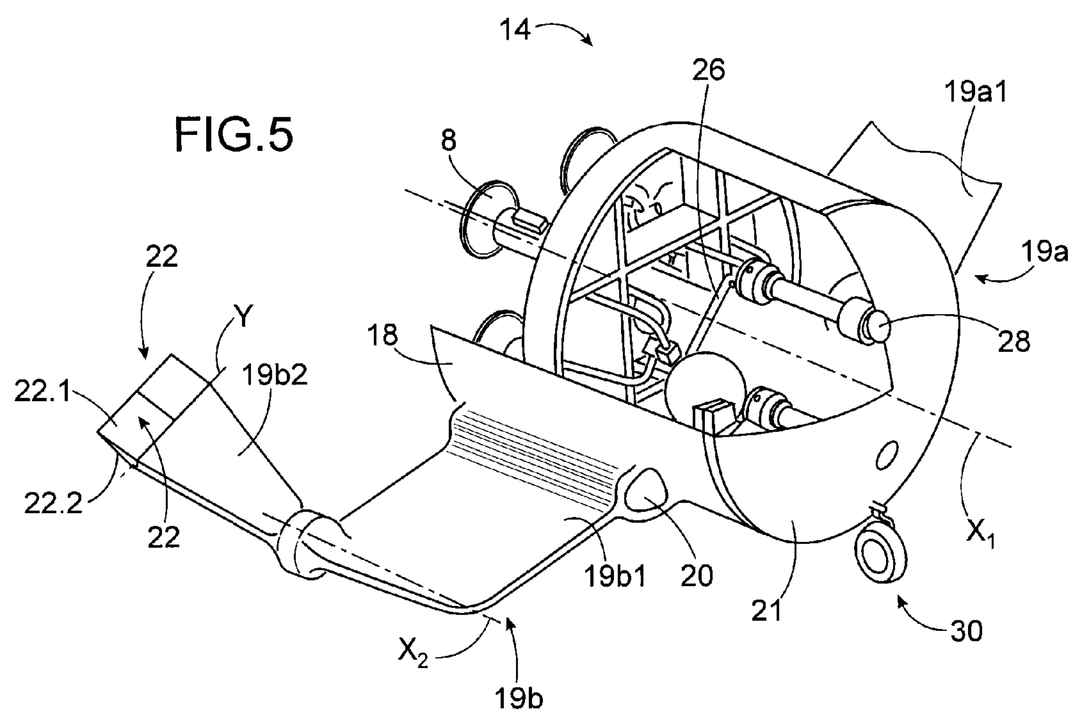
FIG. 5 is a cutaway view of the recoverable module in FIG. 3, FIGS. 6A to 6F are views of the module of FIG. 3 in the various configurations taken on its return to earth.

In FIGS. 3 to 5, the recoverable module 14 can be seen, shown alone.

The module 14 has a longitudinal axis X1, coaxial with the axis X of the launcher in takeoff phase. It comprises a central body formed by a casing 18 that forms the part of the casing of the first stage 4, and the two fins 19*a*, 19*b* of the empennage 10 fixed to the casing 18 so as to be diametrically opposed.

The module 14 comprises a blunt-shaped nose 21 assisting braking because of the increase in the supersonic wave drag during the initial phase of re-entry to atmosphere, this shape reduces the maximum longitudinal load factor (deceleration) and the maximum dynamic pressure on re-entry into the atmosphere.

The module 14 also comprises propulsion means intended to propel the module during the return cruise.

The subsonic propulsion means of the module may be of any type, for example it may be a case of aerobic or electrical propulsion, turboprop engine, a pulse jet, a propeller with a thermal engine or an electrical engine. The propeller may be in the central body or at the wing end.

In the example shown, the module 14 comprises two turbojet engines 20 integrated in the base of the fins on either side of the casing 18.

In a variant, provision can be made for the module to comprise only one propulsion means arranged in an engine in a conduit merged with the longitudinal axis of the module.

When the module 14 forms the bottom part of the first stage of the launcher, pipes 26 of the module are connected to pipes (not shown) in the non-recovered part in order to connect the tanks in the non-recovered part 16 to the cryotechnic engines 8 of the module 14. When the module 14 separates from the non-recovered part, these pipes 26 are closed off by valves 28 at their coupling with the pipes in the non-recovered part.

The module 14 also comprises landing gear 30. Since the module is very short, it is not necessary to have a very high landing gear. A fixed or semi-fixed landing gear can therefore advantageously be provided, projecting from the surface of the launcher permanently. It can therefore be very simple and robust in design. Naturally a module provided with a retractable landing gear does not depart from the scope of the present invention.

The landing gear 30 is composed of three wheels, for example one wheel is fixed to the casing of the module and the other two wheels are fixed to the fins 19*b* and 19*c* or to the central body.

The module 14 comprises attitude control systems (not shown) intended to modify the attitude of the module during the exoatmospheric phase. These systems are, non-limitatively, at the end of the fins 19*a* and 19*b* close to the connection with the stabilisers. They may in a variant be situated on the body.

We shall now describe the fins 19*a* and 19*b*. These form the lift surface of the module 14 in order to provide its aerodynamic lift and enable it to return to the ground.

According to the present invention, each fin 19*a* and 19*b* comprises a wing 19*a*1, 19*b*1 respectively and a stabiliser 19*a*2, 19*b*2 respectively.

Since the two fins are identical, we shall describe in detail only the fin 19*a*.

The wing 19*a*1 has, particularly advantageously, a conventional aircraft wing shape. The wing therefore has a fixed form. In addition, it can advantageously be of substantially constant thickness, which simplifies its design.

The stabiliser 19*a*2 is mounted articulated for rotation on a downstream end of the wing 19*a*1. In the example shown, the rotation axis X2 of the stabiliser 19*a*2 is substantially parallel to the axis X1 of the module. The angle of rotation of the stabiliser is for example no more than 30°, or even 40°. Provision can be made, in a variant, for the rotation axis X2 to be inclined with respect to the axis X1, for example by a divergent or convergent angle of 5° to 10°.

The stabilisers may be fixed throughout the return flight.

For example, the articulation between the stabiliser 19*a*2 and the wing 19*a*1 is formed by a cylindrical connection of axis X2, and the stabiliser therefore pivots about the axis X2 with respect to the wing 19*a*1. Alternatively, the articulation could be of the swivel type.

In the example shown, the stabiliser is in the shape of a triangle articulated on the wing at a vertex of the triangle. Naturally the stabilisers may have another shape, for example square, delta gothic, etc.

In addition, according to the invention, the stabiliser 19*a*2 is equipped with at least one pair 22 of lower wing surface and uppers wing surface flaps 22.1, 22.2 mounted articulated on the stabiliser about an axis Y, substantially orthogonal to the axis X2. The pair of lower wing surface and upper wing surface flaps are also referred to as "crocodile flaps". The two lower wing surface and upper wing surface flaps 22.1, 22.2 are able to pass from a closed position, in which the two flaps are substantially one on top of the other so as to form a single flap, to an open position in which the two lower wing surface and upper wing surface flaps are separated from each other on either side of the plane of the stabiliser.

When the lower wing surface and upper wing flaps form only one flap, they fulfil the function of depth setting providing longitudinal stability and, when they are separated, they fulfil a braking function.

In a variant, provision can be made to separate the braking and depth setting functions. For example, lower wing surface and upper wing surface flaps of reduced size are placed at the centre of the stabiliser and two depth setting flaps are arranged on either side of the lower wing surface and upper wing surface flaps, participating in longitudinal stabilisation.

In the example shown, the stabilisers 19*a*2, 19*b*2 are each equipped with two pairs of lower wing surface and upper wing surface flaps 22.

The movements of the stabilisers and lower wing surface and upper wing surface flaps may be obtained by any type of known means, for example use can be made of a pneumatic, hydraulic or electrical control.

During takeoff, the stabilisers may either be aligned with the wings or be pivoted by an angle with respect to the flaps, for example of 90°.

As we shall explain during the description of the functioning of the module according to the present invention, it is preferable to have a rapid startup of the engine or engines 20, for example turbojet engines. Use is then advantageously made of a supplementary energy source on the power shaft of the turbojet engine or engines, for example a thermal battery to supply a high-power electric starter, able to set the turbojet engines in rotation in an accelerated fashion. The power of the starter is transmitted to the utility shaft of the turbojet engines. Provision is preferably made to change the thermal battery after each flight.

The module 14 is connected to the non-recovered part 16 by means of a known type, such as flanges.

The module 14 has great intrinsic passive stability, i.e. between supersonic flight and Mach 0.8, the module 14 is automatically positioned with nose forwards in the direction of fall. Thus, in the case where the module and the non-recovered part separate in a non-conventional manner, the module would automatically and naturally resume its stable position without its being necessary to provide specific means for ensuring such repositioning.

We shall now describe the various phases of the flight of the module according to the invention by means of FIGS. 6A to 6F and 7.

In its initial configuration shown in FIG. 2, the launcher is composed of the first stage 4, the second stage 6 containing the payload and the fairing. The first stage 4 is composed of the module 14 and the full tanks. In the configuration shown, each stabiliser 19*a*2 and 19*b*2 may be substantially in the plane of the wing 19*a*1, 19*b*1 respectively.

The launcher equipped with the module 14 takes off vertically, propelled by the cryotechnic engines, these being supplied by the tanks placed in the non-recovered part, which corresponds to phase I. At an altitude of around 50 km, the first stage 4 disconnects from the second stage 6; the speed is approximately Mach 5. Henceforth the module 14 is attached only to the tanks, which corresponds to step II of the trajectory shown schematically in FIG. 7.

After the separation from the second stage, the first stage 4 continues a suborbital ballistic trajectory (phase III) until it leaves the Earth's atmosphere.

It is then that the module 14 is separated from the non-recovered part 16; the dynamic pressure is then very low, around 20 Pa (phase IV).

Figure 6A:
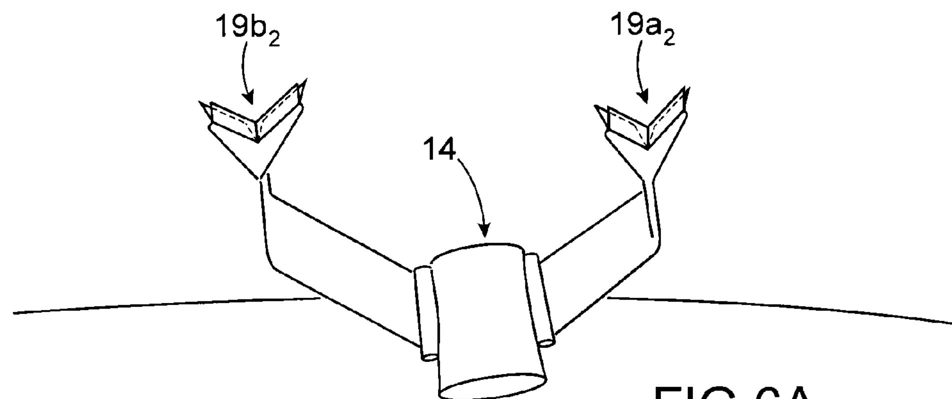
Figure 7:
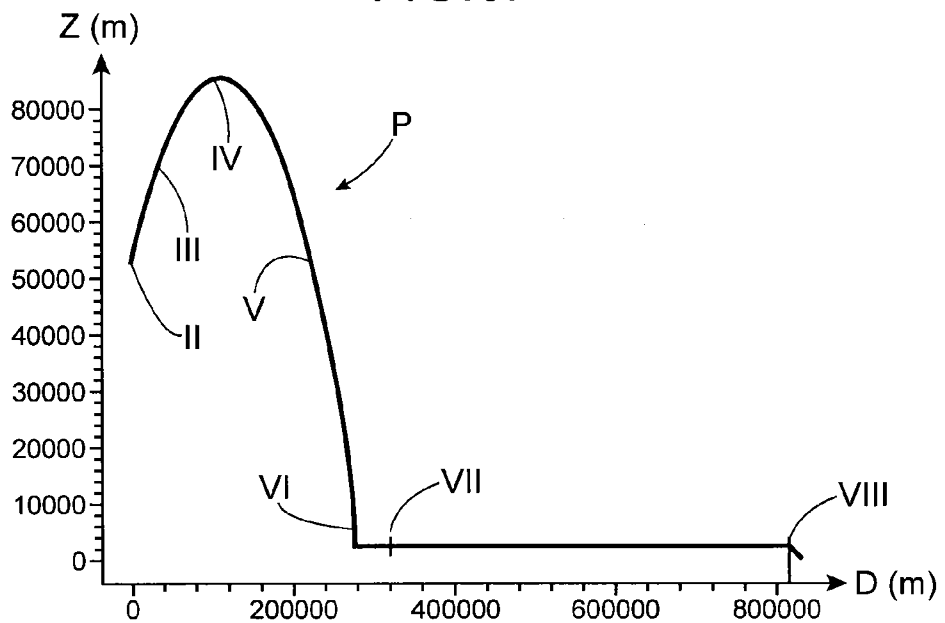
FIG. 7 is a schematic representation of the trajectory of the module of FIGS. 3, 4 and 5, represented by the variation in height Z of the module in meters as a function of the distance D measured on the ground in meters traveled with respect to the point of separation of the first and second stages.

Provision is advantageously made to effect the separation of the module 14 and the non-recovered part 16 in a direction perpendicular to the trajectory plane P, which is formed by the plane of the sheet in FIG. 7, so as to provide sufficient discrimination between the module 14 and the non-recovered part 16. For this purpose, before separation, the first stage is oriented so that its longitudinal axis is substantially orthogonal to the plane of the trajectory P by means of attitude control systems. When the first stage 6 is correctly oriented, the separation of the module 14 and the normally covered part 16 is caused by known means, for example similar to those employed for the separation of the first and second stages. Since the module 14 has a density very much greater than that of the non-recovered part 16, it will fall faster and further. In addition, as indicated previously, the module, because of its intrinsic stability, will automatically orient itself so as to have the nose downwards, as can be seen in FIG. 6A.

The module 14 then falls in a ballistic trajectory shown in FIG. 6A. During this fall phase, the stabilisers 19*a*2, 19*b*2 if necessary pivot about the axis X2 in order to adopt the required stabilisation position during the atmospheric flight phase.

Figure 6B:
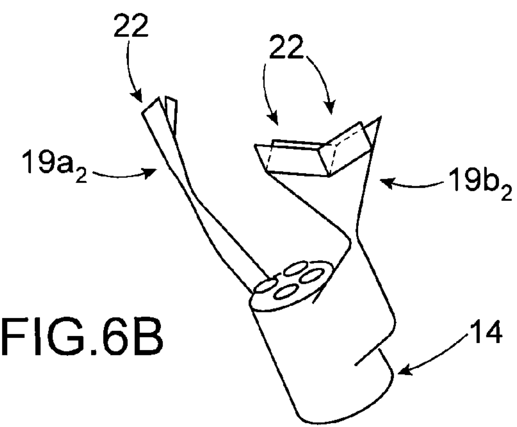
Figure 6C:
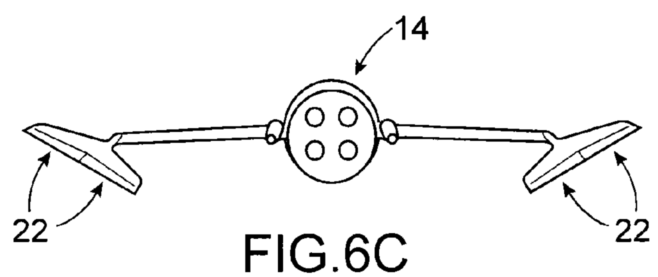

At point V, the module 14, shown in FIG. 6B, makes a ballistic atmosphere re-entry at zero incidence and sideslip, the lower wing surface and upper wing surface flaps 22 of each pair are separated from each other, so as to be placed aslant with respect to the plane of the stabiliser and of the wing and thus to form a significant braking and stabilisation surface.

The lower wing surface and upper wing surface flaps 22 are kept open until the module 14 reaches a subsonic speed, close to Mach 0.85, the altitude corresponding to this speed being approximately 10 km (point VI in the trajectory). It can be shown that this speed always corresponds substantially to an altitude of 10 km for various conditions of culmination of the first stage and various values of the ballistic coefficient of the module 14.

At point VI (FIG. 6C), and therefore at an altitude of approximately 10 km, the lower wing surface and upper wing surface flaps are closed and the single flap that they form is then put in a position so that it creates a stalling moment thus initiating the resource. The resource thus initiated takes place under a load factor of around 2.5 g transverse. The end of the resource takes place at an altitude of approximately 2500 m.

Figure 6D:
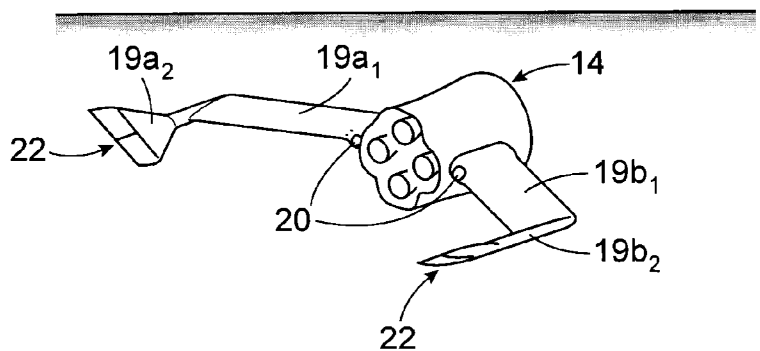

The atmosphere propulsion, for example the turbojet engines, is then started up quickly by means of the thermal battery for the turbojet engines (from FIG. 6C to FIG. 6D), a little before the module is leveled out (FIG. 6D). As from point VII, it is a case of the return cruising phase; this takes place at a subsonic speed of around Mach 0.3 and at an altitude of approximately 3500 m. A progressive adjustment towards the optimum cruising altitude can be provided.

Figure 6E:
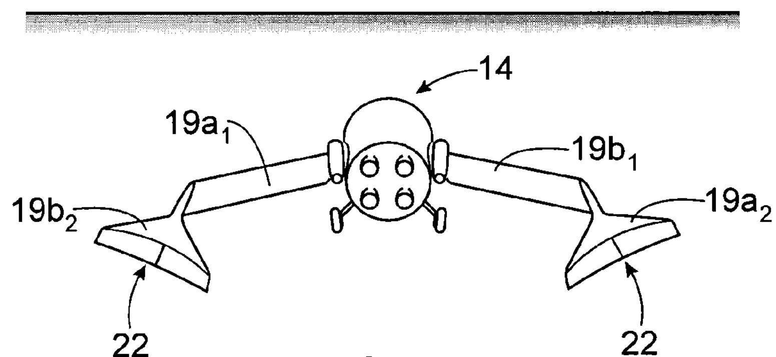
Figure 6F:
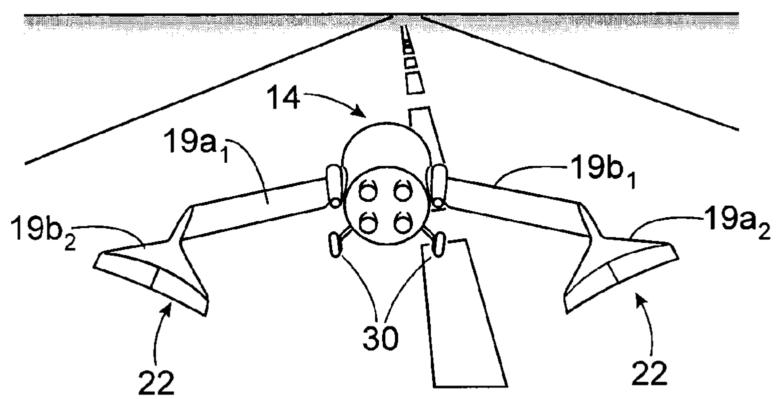

This cruising phase terminates as from point VIII by landing on a conventional landing strip, advantageously not far from the launch pad of the launcher; FIGS. 6E and 6F show the approach and landing phases respectively.

This landing is generally followed by taxiing to a secure area for the craft to be put back in flight condition.

Advantageously the landing takes place automatically and the taxiing takes place autonomously, thus avoiding blocking the runway and allowing several successive landings of modules, for example in the case where the modules are boosters.

Naturally the vehicle may return otherwise than on the launch pad of the launcher that it equipped.

The module according to the present invention is of relatively simple design and also relatively simple and robust in operation.

The orientation of the stabilisers is not necessarily modified during the cruising phase and only the lower wing surface and upper wing surface flaps are moved.

The flight of the module may be completely autonomous or controlled remotely.

By separating the lift and stabilisation functions, the module dispenses with the drawbacks relating to flying wings.

The fins of the launcher according to the invention forming the lift surface of the module according to the invention do not have any twist, which is generally a problem during the launch of the launcher and the re-entry of the module into the atmosphere.

Moreover, these are of simpler and less expensive designs.

Moreover, in the case of a flying wing, balancing and longitudinal and lateral stability are obtained by a set of movable surfaces distributed over the leading edge of the wings, which involves complex control of the orientation of these surfaces. In the case of the present invention, stability is obtained by means of the stabilisers 19*a*2, 19*b*2, the control of which is simplified.

In addition, the pushed-back arrangement of the stabilisers at the end of the wings makes it possible firstly to mount the lower wing surface and upper wing surface flaps thereon, and secondly to increase the wave drag significantly, and finally to provide the pushing back of the aerodynamic centre in the vicinity of zero incidence and sideslip.

In addition, the combination of wings and stabilisers (a configuration said to be conventional on an aircraft) increases the robustness to variations in centring, the position of the centre of gravity being able to vary within a greater margin, which facilitates the balancing of the module, which is then similar to that of a conventional aircraft.

In addition, the module according to the present invention offers the advantage of having only a reduced change of shape on the angle of the stabilisers, which is potentially around a few tens of degrees, or even zero. In other words, the moved surfaces are reduced. This is because the change in orientation of the stabilisers is effected in exoatmospheric phase, which does not interfere with the flight of the module. Next, on entry into the atmosphere, preferable only the lower wing surface and upper wing surface flaps on the stabilisers are moved, in a first phase to slow down the module and in a second phase to control the module in cruising flight.

This limited change in shape has the advantage of being able to effect a resource manoeuvre at higher dynamic pressure and Mach since the moved surfaces are reduced, and in fact the force for moving them. This then makes it possible not to have to have recourse to a parachute, which is a consumable element. The general cost is further reduced.

Moreover, there is available a degree of freedom on the dihedron angle of the stabilisers articulated at the wing end. The modification of their orientation makes it possible to adapt the characteristics of the module. This is because, by modifying their orientation, it is possible to adjust the longitudinal position of the centres for incidence and yaw as well as to modulate the vertical position of the centre in roll caused by sideslip.

By virtue of the present invention, the landing and, if necessary during development phases, the takeoff of the module according to the present invention can take place conventionally, with facilitated control for a human pilot, even in a cross wind.

The module 14 according to the present invention represents more than 80% of the value of the launcher and approximately 60% of the inert mass of the first stage. Naturally the percentage represented by the module with respect to the total cost of the launcher depends on the number of engines 20 in the propulsion system. Consequently the use of the module substantially reduces the operating cost of a new launcher.

In addition, the development cost of the module 14 is significantly reduced compared with the development cost of a completely reusable first stage, by approximately 35%.

Assuming 10 reuses of the engines of the launcher by virtue of the return of the module 14, which corresponds approximately to a total service life of 2000 s, the mean recurrent cost, considering a total life cycle of the module of 100 flights, of a first stage according to the present invention, is estimated at 25% of the cost of the corresponding consumable stage over the same 100 flights.

It is advantageously sought to produce very robust propulsion engines in order to maximise the number of reuses thereof.

It therefore appears that the present invention affords a significant reduction in the production and operating cost.

According to the invention, the module uses known technologies tested in the aerodynamic field, and the development costs and time are therefore reduced.

By virtue of the invention, the module 14 has a high space density since it does not include the empty tanks, which facilitates its manipulation when it returns to earth and its recovery scenario.

The blunt shape of the nose maximises the supersonic wave drag.

Provision can be made for further optimising the overall drag of the module during the return flight in subsonic cruising by optimising the shell drag of the module, knowing that this drag represents a main contribution to the overall subsonic drag. For this purpose, provision can be made for adding a rear cone of modifiable form, for example inflatable during the braking phase.

The phases of entry into the atmosphere and subsonic lift offer numerous degrees of freedom for adjusting the performances of the module. The starting speed of the resource can be modified, it is possible to act on the transverse load factor during the resource, and it is also possible to modify the return cruising altitude of the module as far as the landing strip.

The recoverable module 14 according to the present invention can be used for any size of launcher, from nanolaunchers up to superheavy launchers. This module can easily be adapted to various propulsion modules, various sizes of vehicle and various types of mission.

The module according to the present invention has been described in the case of a two-stage launcher but it can also apply to a vehicle with a single stage in order to form a demonstrator or as a flying test bench for experiments in flight, or to a launcher having at least two stages, the module being situated in the bottom stage or in one of the upper stages.

Naturally it would be possible to combine, with the lower wing surface and upper wing surface flaps, one or more parachutes should the braking supplied by the flaps be insufficient.

In a variant, a module comprising fixed wings provided with stabilisers as described can be envisaged, and it can be envisaged obtaining braking by means of a parachute instead of the crocodile flaps.

The invention claimed is:

1. A recoverable module for a propulsion module configured to launch a craft into space, comprising at least one stage, the recoverable module of longitudinal axis being secured to a non-recovered part during launch, the recoverable module configured to be placed in a lower position of the at least one stage, and comprising:

- a central body;
- a propulsion system configured to launch the craft;
- systems for commanding and controlling the propulsion system;
- means of propulsion in subsonic flight;
- lift surfaces for subsonic flight and landing gear, each lift surface comprising two substantially flat wings fixed with respect to the central body, arranged on either side of the central body of the module; and
- at least one stabilizer mounted to be articulated for rotation on a downstream end of each wing, each stabilizer comprising at least one pair of lower wing surface and upper wing surface flaps mounted to be articulated on the stabilizer and configured to be able to separate from each other to be placed on either side of a mid-plane of the stabilizer and brake the module, or to come into abutment against each other to form only a single flap, and longitudinal stabilization means;
- the non-recovered part comprising at least one tank for supplying the propulsion system;
- the recoverable module and the non-recovered part configured to be separated when the propulsion module reaches a given altitude, the recoverable module configured to land in a controlled fashion after a cruising flight, or for a return to a launch site.

2. A recoverable module according to claim 1, in which the longitudinal stabilization means is formed by lower wing surface and upper wing surface flaps when they form only a single flap.

3. A recoverable module according to claim 1, in which the lift surfaces are formed by an empennage of the craft.

4. A recoverable module according to claim 1, in which the stabilizers are articulated for rotation about an axis substantially parallel to a longitudinal axis of the module.

5. A recoverable module according to claim 1, in which the rotation articulation is achieved by a cylindrical coupling or a swivel connection.

6. A recoverable module according to claim 1, in which the propulsion means comprises atmospheric propulsion engines, mounted in roots of the wings.

7. A recoverable module according to claim 1, in which, when the propulsion means is formed by one or more turbojet engines, the propulsion module comprises a supplementary energy source for rapid ignition of the turbojet engine or engines.

8. A recoverable module according to claim 7, in which the supplementary energy source for rapid ignition of the turbojet engine or engines includes a thermal battery supplying a starter of the turbojet engines or engines.

9. A recoverable module according to claim 1, in which the recoverable module has a blunt nose.

10. A propulsion module configured to launch a craft into space, comprising:

- at least one stage comprising at least one recoverable module according to claim 1, and a part configured not to be recovered comprising at least one tank for supplying the propulsion system.

11. A propulsion module configured to launch a craft into space, comprising:

- at least one stage comprising at least one recoverable module according to claim 1, and a part configured not to be recovered comprising at least one tank for supplying the propulsion system, and lateral acceleration stages.

12. A launcher equipped with a propulsion module according to claim 10, comprising at least two stages, a stage formed by the propulsion module and a stage supporting a payload, the two stages being separable.

13. A launcher type equipped with a propulsion module according to claim 11, comprising at least two stages, a stage formed by the propulsion module and a stage supporting a payload, the two stages being separable.

14. A launcher according to claim 12, the launcher configured to be from nanolauncher to superheavy launcher type.

15. A launcher according to claim 14, in which the propulsion module forms a bottom stage of the launcher or one of upper stages.

16. A launcher according to claim 13, the launcher configured to be from nanolauncher to superheavy launcher type.

17. A launcher according to claim 13, in which the propulsion module forms a bottom stage of the launcher or one of upper stages.

18. A method of recovering the recoverable module according to claim 1, comprising:

- a) separation of the recoverable module and the non-recovered part;
- b) free fall of the recoverable module;
- c) on atmospheric entry, opening of the pairs of lower wing surface and upper wing surface flaps until a given speed is reached;
- d) closure of the pairs of lower wing surface and upper wing surface flaps, each pair then forming a single flap;
- e) initiation of a resource by putting the lower wing surface and upper wing surface flaps in position so that they create a deflection moment;
- f) starting at least one propulsion engine in subsonic flight at the end of the resource;
- g) cruising return flight; and
- h) landing.

19. A method according to claim 18, in which the landing is automatic, and is followed by an automatic taxiing and braking phase.

20. A method according to claim 18, further comprising, prior to the atmosphere entry, modification of an orientation of the stabilizers, and if necessary of adjustment in a flight phase.

21. A method according to claim 18, in which, during a), the separation of the recoverable module and the non-recovered part takes place in a direction substantially orthogonal to a plane of a trajectory.

* * * * *